United States Patent [19]

Suzuki

[11] Patent Number: 5,519,540
[45] Date of Patent: May 21, 1996

[54] TAKING LENS FOR UNDERWATER CAMERA

[75] Inventor: Fumio Suzuki, Yokohama, Japan

[73] Assignee: Nikon Corporation, Tokyo, Japan

[21] Appl. No.: 217,846

[22] Filed: Mar. 25, 1994

[30] Foreign Application Priority Data

Apr. 23, 1993 [JP] Japan .................................. 5-096325

[51] Int. Cl.$^6$ ........................................................ G02B 9/34
[52] U.S. Cl. .......................... 359/771; 359/772; 359/780; 359/684; 359/686
[58] Field of Search ................................. 359/684, 686, 359/745, 747, 754, 771, 772, 780

[56] References Cited

U.S. PATENT DOCUMENTS

| | | | |
|---|---|---|---|
| 4,653,876 | 3/1987 | Yamagata | 350/463 |
| 4,666,261 | 5/1987 | Arai | 359/780 |
| 4,770,516 | 9/1988 | Yamagata | 350/454 |
| 4,986,643 | 1/1991 | Moriyama | 350/477 |
| 5,172,273 | 12/1992 | Yamanashi | 359/684 |
| 5,402,268 | 3/1995 | Tatsuno | 359/747 |

FOREIGN PATENT DOCUMENTS

| | | |
|---|---|---|
| 58-34418 | 2/1983 | Japan . |
| 63-139311 | 6/1988 | Japan . |
| 3-141313 | 6/1991 | Japan . |

Primary Examiner—David C. Nelms
Assistant Examiner—Son Mai
Attorney, Agent, or Firm—Shapiro and Shapiro

[57] ABSTRACT

A taking lens for an underwater camera is constituted in the order from the side of a subject of a first lens group having no or slight refracting power, a second lens group having a positive refracting power, a third lens group having positive refracting power and a fourth lens group having negative refracting power. When focusing from the infinity to a closer distance, the first lens group is fixed to the image surface and the second and third lens groups are moved forward along the optical axis such that the distance between the second and third lens groups is changed.

24 Claims, 7 Drawing Sheets

TAKING LENS FOR UNDERWATER CAMERA

BACKGROUND OF THE INVENTION

1. Field of the Invention

The present invention relates to a taking lens for an underwater camera and more particularly to a taking lens for an underwater camera capable of close-up photography.

2. Related Background Art

In performing close-up photography underwater, there has been conventionally used an underwater camera equipped with a close-up photographing device whose visual field frame is equivalent to that of a close-up lens or a single-lens reflex camera equipped with a micro lens and contained in an underwater housing.

However, in the former case, it is difficult to ascertain the taking range and its magnification is not so high. Further, aberration corrections cannot be effected sufficiently. Also, in the latter case, various aberrations occur in the window of the housing, causing the image forming performance to be lowered.

Recently, a single-lens reflex type underwater camera and an underwater specialized lens are likely to be put to practical use. As such an underwater specialized lens, U.S. Ser. No. 855,165 discloses an embodiment having a field angle equivalent to a lens with a rear focal length of approximately 50 mm underwater when converted to the 35 mm size film and an embodiment having a field angle equivalent to a lens with a rear focal length of approximately 105 mm in the same condition.

However, in the former embodiment, it is impossible to take a working distance long in the close-up photography, which is disadvantageous in terms of illumination to a subject.

Also, in the latter embodiment, its structure is the retrofocus type, so the optical system is liable to become large.

SUMMARY OF THE INVENTION

It is therefore an object of the present invention to provide a taking lens for an underwater camera capable of taking photographs with high performance in a range of infinity to a closest focusing distance.

It is another object of the present invention to provide a taking lens for an underwater camera having a comparatively long working distance in close-up photography.

In order to achieve the above and other objects, a taking lens for an underwater camera of the present invention is constituted in the order from the side of a subject of a first lens group with slight refracting power, a second lens group with positive refracting power, a third lens group with positive refracting power and a fourth lens group with negative refracting power. When focusing from the infinity to a closer distance, the first lens group is fixed to an image surface and the second lens group and the third lens group are moved forward along the optical axis such that the distance between the second and third lens groups is changed.

In the present invention, "a first lens group with slight refracting power" is defined a first lens group has slight refracting power or a first lens group has non-refracting power.

The structure of each of the lens groups will be described hereinafter.

The first lens group $G_1$ closest to the subject is fixed to the image surface and serves as a pressure resistant waterproof window. The first lens group $G_1$ has no or slight refracting power. On the other hand, if the first lens group $G_1$ has strong refracting power, since the forward moving amounts of the second lens group $G_2$ and the third lens group $G_3$ are comparatively large, aberration variations by focusing, especially the aberration variations of light from a subject point on the optical axis passing the outer edge of the pupil (hereinafter referred to as the Rand ray) become large.

Next, the second and third lens groups $G_2$ and $G_3$ have the positive refracting power while the fourth lens group $G_4$ has the negative refracting power. When focusing from the infinity to a closer distance, the second and third lens groups $G_2$ and $G_3$ are moved toward the subject along the optical axis with respect to the fourth lens group $G_4$ while the distance between the second and third lens groups $G_2$ and $G_3$ is being changed.

In the optical system capable of the close-up photography as in the present invention, as the magnification increases, the moving amount of lenses for focusing becomes generally large. For example, letting the magnification and the focal length of the entire optical system be $f_A$ and $\beta_A$ respectively, the forward moving amount of the entirely forward moving type lenses $x_A$ is expressed as $$x_A = -\beta_A \cdot f_A. \qquad \hat{1}$$

For example, when the magnification is set to the life size ($\beta_A = -1$), the forward moving amount $x_A$ becomes large to be $$x_A = f_A.$$

On the other hand, in the optical system constituted of a front lens group having positive refracting power ($1/f_p$) and a rear lens group having negative refracting power ($1/f_n$), a case wherein the front lens group is moved toward the subject by $x_B$ for focusing with the rear lens group fixed will be discussed.

Here, letting the composite focal length in the infinity focus condition, the magnification of the front lens group, the magnification of the rear lens group and the composite magnification be $f_B$, $\beta_p$, $\beta_n$ and $\beta_B$ respectively, the equation of the forward moving amount $x_B$ from $$x_B = -\beta_p \cdot f_p$$

$$\beta_B = \beta_p \cdot \beta_n$$

$$f_B = f_p \cdot \beta_n$$

becomes $$x_B = -\beta_B \cdot f_p^2 / f_B. \qquad \hat{2}$$

Accordingly, when the composite magnification (image magnification) $\beta_B = -1$, the forward moving amount $x_B$ is given by $$x_B = f_p^2 / f_B.$$

Here, $f_n < 0, \beta_n > 1$, so, $$x_B / x_A = f_p^2 / f_B^2 = 1/\beta_n^2 < 1.$$

As a result, $$x_B < x_A.$$

Consequently, when the optical system has the two group structure constituted of the front lens group with the positive refracting power and the rear lens group with the negative refracting power and the front group forward moving method is adopted, the forward moving amount can be reduced as compared with the entirely forward moving method.

In the optical system of the present invention, if the second lens group $G_2$ and the third lens group $G_3$ are assumed to be the front lens group integrally, the optical system substantially becomes the two group type having the positive lens group and the negative lens group and the fourth lens group $G_4$ with the negative refracting power Corresponds to the rear lens group. It is to be noted that the first lens group $G_1$ has extremely smaller refracting power than the other lens groups and then is neglected.

The difference between the optical system of the present invention and the optical system of the two group type is that when focusing from the infinity to a closer distance, the second and third lens groups $G_2$ and $G_3$ with the positive refracting power corresponding to the front group are moved toward the subject while the distance therebetween is being changed.

At this time, it is preferable to set the distance between the second and third lens groups $G_2$ and $G_3$ at any magnification smaller than the distance between the second and third lens groups $G_2$ and $G_3$ in the infinity focus condition. Thereby, the refracting power of the front group consisting of the second and third lens groups $G_2$ and $G_3$ is greater at the closer focusing distance.

That is, when the focal length of the second lens group $G_2$, the focal length of the third lens group $G_3$, the composite focal length of the second and the third lens groups $G_2$ and $G_3$, the distance between the principal points of the second and third lens groups $G_2$ and $G_3$ in the infinity focus condition and the change amount of the distance of the principle points thereof in the close-up photography condition are respectively assumed to be $f_2$, $f_3$, $f_{23}$ D and $\Delta(<0)$, the following relationship holds:

$$1/f_{23}=(1/f_2)+(1/f_3)-[(D-\Delta)/(f_2 \cdot f_3)], \qquad \hat{3}$$

wherein $f_2>0$ and $f_3>0$.

As is apparent in the equation $\hat{3}$, the composite focal length $f_{23}$ of the second and third lens groups $G_2$ and $G_3$ is shorter at a closer focusing distance.

Accordingly, as the composite focal length $f_{23}$ corresponds to $f_p$ of the equation $\hat{2}$, the moving amount of the second and third lens groups $G_2$ and $G_3$ is lessened for focusing.

If the refracting power of each of the second and third lens groups $G_2$ and $G_3$ is set small, the moving amounts of the second and third lens groups $G_2$ and $G_3$ are increased. However, as the moving amounts of the second and third lens groups are small in the present invention, it is possible to make the composite refracting power of the second and third lens groups $G_2$ and $G_3$ small, which is advantageous for correcting the spherical aberration.

When the refracting power of the second and third lens groups is made weak, the magnification of the fourth lens group $G_4$ with the negative refracting power can be set to be comparatively low. Thereby, the negative refracting power of the fourth lens group $G_4$ can be set weak, which is advantageous for correcting aberrations. Especially, the balance of the Petzval's sum becomes preferable, making it possible to correct the field curvature and the astigmatism easily.

Thus, according to the present invention, it is possible to perform the underwater photography with high performance in a wide range of the infinity to the closest focusing distance for the life size. Further, it is possible to obtain the taking lens for the underwater camera in which the working distance at the time of the close-up photography is long.

Figure 1:
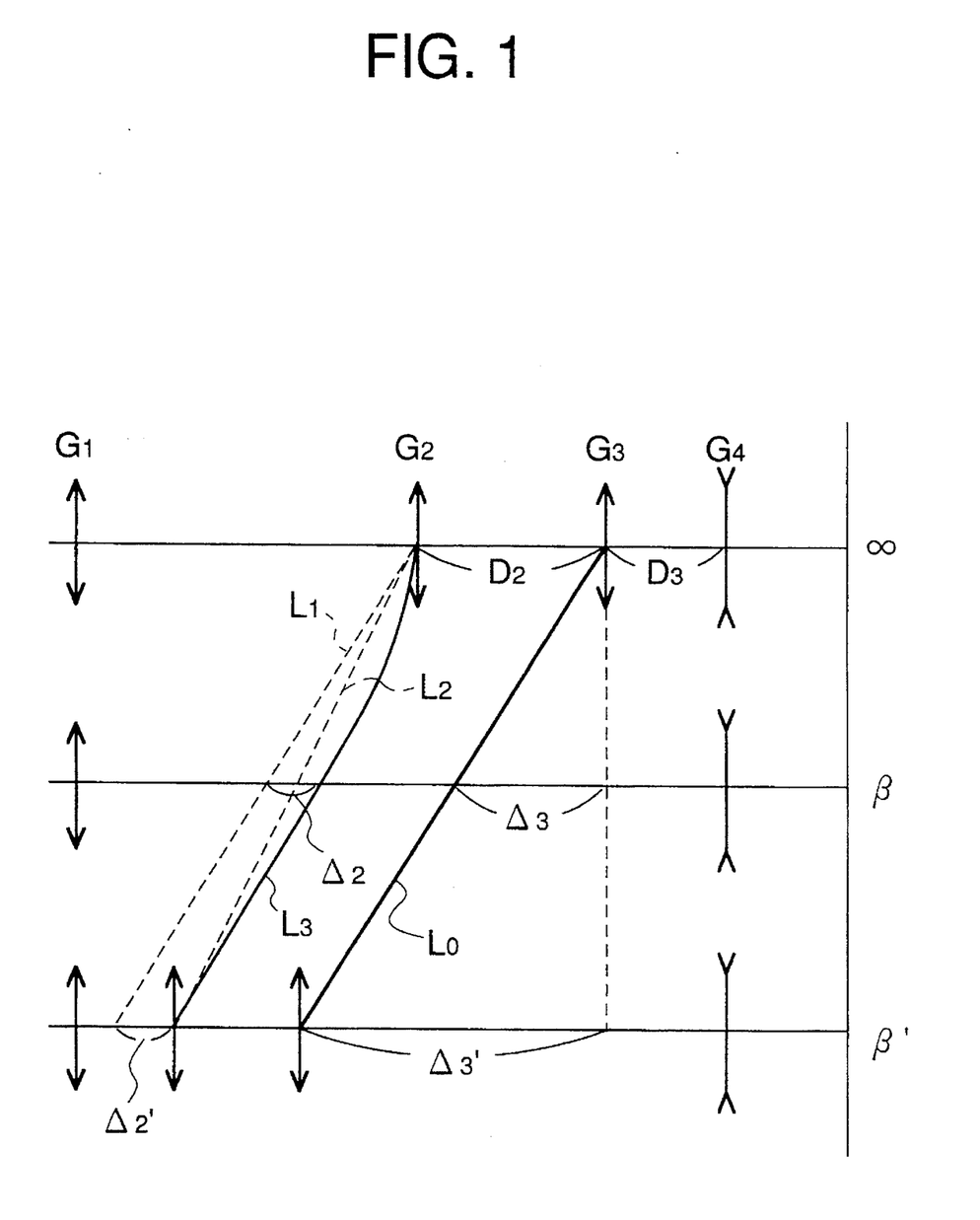
FIG. 1 is a schematic diagram showing a principle of the present invention.

Referring to FIG. 1, the focusing coefficient C' in the closest distance focus condition and the focusing coefficient C at any magnification β will be described hereinafter. Here, letting the change amount of the distance between the second and third lens groups $G_2$ and $G_3$ in the closest distance focus condition from the infinity focus condition and the change amount of the distance between the third and fourth lens groups $G_3$ and $G_4$ in the closest distance focus condition from the infinity focus condition be $\Delta_2'$ and $\Delta_3'$ respectively, the focusing coefficient C' is expressed as $$C'=\Delta_2'/\Delta_3'.$$

Also, letting the change amount of the distance between the second and third lens groups $G_2$ and $G_3$ at the magnification β from the infinity focus condition and the change amount of the distance between the third and fourth lens groups $G_3$ and $G_4$ at the magnification from the infinity focus condition be $\Delta_2$ and $\Delta_3$ respectively, the focusing coefficient C is expressed as $$C=\Delta_2/\Delta_3.$$

In FIG. 1, ∞,β and β' express respectively the arrangements of the lens groups in the infinity focus condition, at a certain magnification and in the closest distance focus condition. $L_0$ is the locus of the third lens group $G_3$ moving by focusing. $L_1$ is the locus of the second lens group $G_2$ when the focusing coefficients are C=C'=0, i.e., when the second and third lens groups $G_2$ and $G_3$ move integrally. Further, $L_2$ is the locus of the second lens group $G_2$ when the coefficients are C=C' (<0) while $L_3$ is the locus of the second lens group $G_2$ when the coefficients are C<C' (<0).

When the focusing coefficient C is C=C' and the second lens group $G_2$ is moved along the locus $L_2$, the optical performance in the infinity focus condition and the closest distance focus condition is enhanced but the optical performance at the magnification β is deteriorated since the spherical aberration and the field curvature are corrected excessively in the positive direction from the proper values.

Accordingly, in the present invention, it is preferable to set the focusing coefficient C to be C<C' and to move the second lens group $G_2$ along the locus $L_3$ which draws a curve projecting toward the surface of the film. Thereby, the spherical aberration and the field curvature can be corrected appropriately.

Specifically, in the taking lens for the underwater camera according to the present invention, it is preferable to satisfy the following conditions:

$$-0.30 < C' < 0, \qquad (1)$$
$$C_S < C < C_L, \qquad (2)$$
$$C_S = -(C' + 0.45)\beta - 0.5,$$
$$C_L = -0.05\beta + (C' - 0.05),$$

wherein

β: a certain magnification,

C': the focusing coefficient in the closest distance focus condition ($C'=\Delta_2'/\Delta_3'$), C: the focusing coefficient at the magnification β, ($C=66_2/\Delta_3$), $\Delta_2'$: the change amount of the distance between the second and third lens groups $G_2$ and $G_3$ in the closest distance focus condition from the infinity focus condition, $\Delta_3'$: the change amount of the distance between the third and fourth lens groups $G_3$ and $G_4$ in the closest distance focus condition from the infinity focus condition, $\Delta_2$: the change amount of the distance between the second and third lens groups $G_2$ and $G_3$ at the magnification $\beta$ from the infinity focus condition, $\Delta_3$: the change amount of the distance between the third and fourth lens groups $G_3$ and $G_4$ at the magnification $\beta$ from the infinity focus condition.

The condition (1) specifies the focusing coefficient C' in the closest distance focus condition to maintain high image forming performance in the closest distance focus condition as well as to lessen the moving amounts of the second and third lens groups $G_2$ and $G_3$.

If the focusing coefficient C' exceeds the upper limit of the condition (1), it becomes positive so that the composite focal length of the second and third lens groups $G_2$ and $G_3$ in the closest distance focus condition becomes long as compared with the infinity focus condition. Therefore, the moving amounts of the second and third lens groups $G_2$ and $G_3$ become large and it is impossible to form the entire optical system small.

If the focusing coefficient C' exceeds the lower limit of the condition (1), the composite refracting power of the second and third lens groups $G_2$ and $G_3$ becomes too strong, whereby the correction of the annular spherical aberration becomes difficult.

The condition (2) specifies the focusing coefficient C at the magnification $\beta$ to maintain high image forming performance at the magnification $\beta$.

If the focusing coefficient C exceeds the upper limit of the condition (2), it becomes too close to the focusing coefficient C', whereby the corrections of the positive field curvature and the astigmatism become difficult.

When the focusing coefficient C exceeds the lower limit of the condition (2), it becomes large in the negative direction. As a result, the composite refracting power of the second and third lens groups $G_2$ and $G_3$ at the magnification $\beta$ becomes too large so that the bending of the spherical aberration occurs and its correction becomes difficult.

Figure 2:
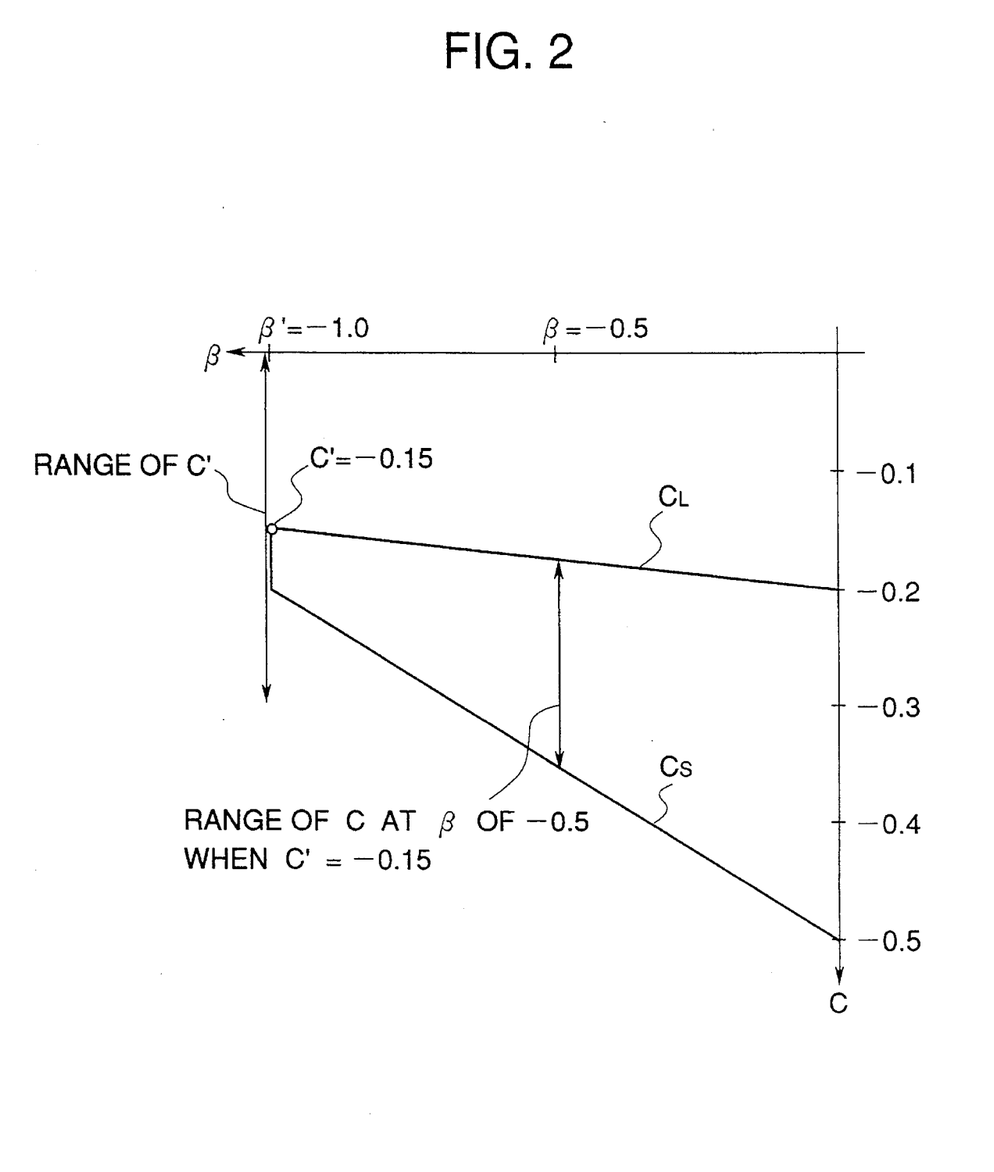
FIG. 2 is a diagram showing an example of the ranges of focusing coefficients in the present invention.

Ranges of the conditions (1) and (2) will be described with reference to FIG. 2. In FIG. 2, the magnification $\beta'$ in the closest distance focus condition is $-1.0$ and the focusing coefficient C' is $-0.15$. After the magnification $\beta'$ and the focusing coefficient C' are thus determined, the respective lines $C_L$ and $C_S$ expressing the upper and lower limits of the focusing coefficient at the magnification $\beta$ are determined. Here, in the telephoto lens for the underwater camera according to the present invention, when the focusing coefficient C is within the range surrounded by the lines $C_L$ and $C_S$, the optical performance becomes preferable.

For example, when the magnification $\beta$ is $\beta=-0.5$, the optical performance becomes preferable when the focusing coefficient C is within a range sandwiched by the lines $C_L$ and $C_S$, as indicated by the arrow in FIG. 2.

Also, in the taking lens for the underwater camera according to the present invention, it is preferable to satisfy the following condition:

$$0.65 < f_{23}/f < 0.85, \qquad (3)$$

wherein f: the rear focal length of the entire optical system in the infinity focus condition when the subject field medium is water, $f_{23}$: the composite focal length of the second and third lens groups $G_2$ and $G_3$ in the infinity focus condition.

The condition (3) specifies the composite focal length $f_{23}$ of the second and third lens groups $G_2$ and $G_3$ in the infinity focus condition with respect to the rear focal length of the entire optical system in the infinity focus condition when the subject field medium is water.

When $f_{23}/f$ exceeds the upper limit in the condition (3), the moving amounts of the second and third lens groups $G_2$ and $G_3$ for focusing becomes too large. Then, even though the second and third lens groups $G_2$ and $G_3$ are moved toward the subject at the time of close-up photography while the distance therebetween is being reduced, the whole shifting amount cannot be reduced.

When $f_{23}/f$ exceeds the lower limit of the condition (3), the magnification of the fourth lens group $G_4$ with the negative refracting power needs to be strong. Thereby, the negative refracting power of the fourth lens group $G_4$ becomes strong so that the Petzval's sum becomes excessively negative and the corrections of the field curvature and the astigmatism becomes difficult. Further, the refracting power of the second and third lens groups $G_2$ and $G_3$ becomes strong, so that the spherical aberration occurs largely and the correction thereof becomes difficult.

In the present invention, the first lens group $G_1$ does not have the strong refracting power so as to prevent the aberration variations of the Rand ray from being large. However, when the subject field medium is water, the incident ray from outside the optical axis on the first lens group $G_1$ is refracted strongly toward the optical axis, thereby causing the positive distortion and the transverse chromatic aberration.

In the present invention, the width of the field angle is approximately equal to that of the middle size telephoto lens, so the positive distortion occurring in the first lens group $G_1$ is comparatively small. Therefore, when the distortion occurring in the optical system after the first lens group $G_1$ is the negative or the considerably negligible positive, the distortion in the entire optical system causes practically no problem.

However, the transverse chromatic aberration occurring in the first lens group $G_1$ is comparatively large, so it is preferable to correct the aberration in the other lens groups $G_2$ to $G_4$. However, in order to prevent the variations of the axial chromatic aberration and the transverse chromatic aberration by focusing operations, it is desirable to structure the second and third lens groups $G_2$ and $G_3$ so as to correct the axial chromatic aberration and the transverse chromatic aberration independently. Therefore, it is difficult to correct the transverse chromatic aberration from the first lens group $G_1$ by the second and third lens groups $G_2$ and $G_3$.

Then, in the present invention, it is preferable to structure the fourth lens group $G_4$ to have in the order from the side of the subject at least a first lens element $L_{41}$ with positive refracting power, a second lens element $L_{42}$ with negative refracting power and a third lens element $L_{43}$ with positive refracting power. Also, the dispersion number of the niter material for each of the lens elements $L_{41}$, $L_{42}$ and $L_{43}$ is preferably set to satisfy $$0.20 < (V_{41} - V_{42})/V_{43} < 0.75, \qquad (4)$$

wherein $V_{41}$: the inverse number of the Abbe's number of the first lens element $L_{41}$, $V_{42}$: the inverse number of the Abbe's number of the second lens element $L_{42}$, $V_{43}$: the inverse number of the Abbe's number of the third lens element $L_{43}$.

The condition (4) specifies the dispersion number of the niter material for each of the lens elements $L_{41}$, $L_{42}$ and $L_{43}$ to preferably correct the axial chromatic aberration and the transverse chromatic aberration in the whole optical system. Thereby, the axial chromatic aberration occurring in the fourth lens group $G_4$ is kept small and the transverse chromatic aberration in the direction opposite to the transverse chromatic aberration occurring in the first lens group $G_1$ can be developed, making it possible to preferably correct the axial chromatic aberration and the transverse chromatic aberration in the whole optical system.

When $(V_{41}-V_{42})/V_{43}$ exceeds the upper limit of the condition (4), the dispersion number of the third lens element $L_{43}$ in the fourth lens group $G_4$ becomes too small, causing the lack of the correction of the transverse chromatic aberration occurring in the first lens group $G_1$.

On the other hand, when $(V_{41}-V_{42})/V_{43}$ exceeds the lower limit of the condition (4), the dispersion number of the third lens element $L_{43}$ in the fourth lens group $G_4$ becomes too large, causing the excessive correction of the transverse chromatic aberration occurring in the first lens group $G_1$.

Further, in the present invention, when the subject field medium is water and the rear focal length of the entire optical system and the focal length of the first lens group $G_1$ are respectively assumed to be f and $f_1$ it is desirable to satisfy the following condition:

$$-0.25 < f/f_1 < 0.25. \qquad (5)$$

The condition (5) specifies the focal length of the first lens group $G_1$ with respect to the rear focal length of the entire optical system.

When $f/f_1$ exceeds the upper limit of the condition (5) and the first lens group $G_1$ has large positive refracting power, considerably large positive distortion and transverse chromatic aberration occur, which are difficult to be corrected in the optical system on the side of the image after the second lens group $G_2$.

When $f/f_1$ exceeds the lower limit of the condition (5) and the first lens group $G_1$ has strong negative refracting power, the Rand ray is dispersed largely in the first lens group $G_1$ and passing positions of the Rand ray in the second and third lens groups $G_2$ and $G_3$ by focuses are changed largely. Thereby, it is difficult to inhibit aberration variations, especially the variations of the spherical aberration and the coma aberration.

The other objects and advantages will be fully understood by preferred embodiments described below.

DESCRIPTION OF THE PREFERRED EMBODIMENTS

Preferred embodiments of the present invention will be described.

FIGS. 3 to 7 respectively show the structures of lenses of first, second, fourth and fifth preferred embodiments in the infinity focus condition. The lenses of each of embodiments constitute a middle-size telephoto lens capable of close-up photography underwater with the degrees of F-number of about 2.8 and the rear focal length of about 105 mm.

The telephoto lens of each of the embodiments has in the order from the side of a subject a first lens group with no or slight refracting power, a second lens group with positive refracting power, a third lens group with positive refracting power and a fourth lens group with negative refracting power. When focusing from the infinity to a closer distance, the second and third lens group $G_2$ and $G_3$ are moved on the optical axis toward the subject with respect to the fourth lens group $G_4$ while the distance between the second and third lens groups $G_2$ and $G_3$ is being changed.

In the respective embodiments, the medium in the subject field is water having the refractive index $n_w=1.33306$ and the Abbe's number $v_w=53.98$. Although the middle-size telephoto lenses for the underwater camera of the present invention suppose that the subject field medium is water, it goes without saying that they are applicable to other liquids having the refractive indices close to that of water such as seawater, ethyl alcohol, etc.

Figure 3:
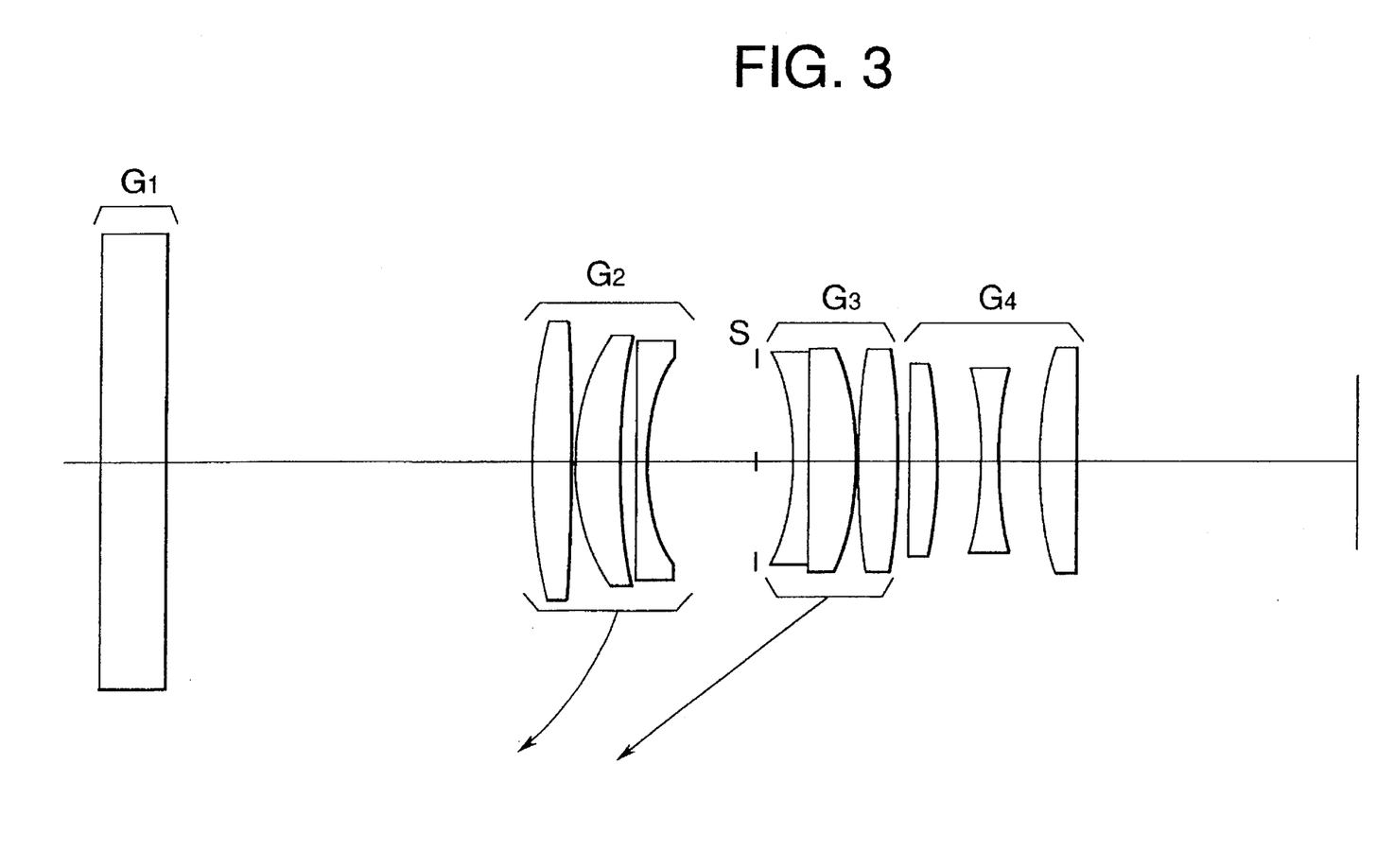
FIG. 3 is a diagram showing the structure of lenses of a first preferred embodiment according to the present invention.

FIG. 3 shows the structure of lenses of the first embodiment. Specifically, the first lens group $G_1$ is constituted of a parallel-plane-plate having no refracting power. The second lens group $G_2$ is constituted of a biconvex positive lens, a positive meniscus lens having a convex surface on the side of the subject and a negative meniscus lens having a convex surface on the side of the subject. The third lens group $G_3$ is constituted of a negative meniscus lens having a concave surface on the side of the subject, a positive lens cemented to the negative meniscus lens and a biconvex positive lens. Also, the fourth lens group $G_4$ is constituted of a positive meniscus lens having a convex surface on the side of the image, a biconcave negative lens and a biconvex positive lens.

The following Table 1 shows values of various elements of the first embodiment. In the Table 1, f, β, F and 2ω respectively express the rear focal length of the whole system, the magnification, F-number and the field angle underwater in the infinity focus condition. Figures in the left end express the order from the side of the subject. Also, r, d, n and ν respectively express the radius of curvature of a lens surface, the distance between lens surfaces, the refractive index and the d-lines (λ=587.6 nm) of the Abbe's number.

TABLE 1

| | f = 105.0 mm | F = 2.84 | 2ω = 17.4° | |
|---|---|---|---|---|
| | r | d | ν | n |
| 1 | 0.000 | 10.00 | 64.1 | 1.51680 |
| 2 | 0.000 | (d2) | | |
| 3 | 94.190 | 5.00 | 53.8 | 1.69350 |
| 4 | −519.938 | 1.00 | | |
| 5 | 33.303 | 6.50 | 53.8 | 1.69350 |
| 6 | 93.654 | 1.80 | | |
| 7 | 284.394 | 1.80 | 30.0 | 1.69895 |
| 8 | 29.466 | (d8) | | |
| 9 | −33.534 | 1.80 | 37.0 | 1.61293 |

TABLE 1-continued

| | f = 105.0 mm | F = 2.84 | 2ω = 17.4° | |
|---|---|---|---|---|
| | r | d | ν | n |
| 10 | −1000.000 | 7.00 | 45.4 | 1.79668 |
| 11 | −42.558 | 0.20 | | |
| 12 | 131.547 | 4.50 | 53.8 | 1.69350 |
| 13 | −166.760 | (d13) | | |
| 14 | −1273.234 | 3.80 | 29.5 | 1.71736 |
| 15 | −63.687 | 6.80 | | |
| 16 | −48.249 | 2.00 | 40.9 | 1.79631 |
| 17 | 48.851 | 6.80 | | |
| 18 | 50.175 | 5.00 | 40.7 | 1.58144 |
| 19 | −605.708 | (Bf) | | |

| | f = 105.0000 | β = −0.5000 | β = −1.0000 |
|---|---|---|---|
| D0 | ∞ | 288.5789 | 187.2690 |
| d2 | 53.4810 | 29.2396 | 3.0031 |
| d8 | 22.1727 | 17.8948 | 16.5640 |
| d13 | 3.0531 | 31.5724 | 59.1396 |
| Bf | 42.0697 | 42.0697 | 42.0697 |

Next, condition corresponding values are shown below.
[Condition Corresponding Values]

(1) C'=−0.100 (β=−1.0)

(2) $C_S$=−0.325
$C_L$=−0.125
C=−0.150 (β=−0.5)

(3) $f_{23}/f$=0.735

(4) $(V_{41}-V_{42})/V_{43}$ =0.387

(5) $f/f_1$=0

Next, the lens groups of the second embodiment will be described with reference to FIG. 4.

Figure 4:
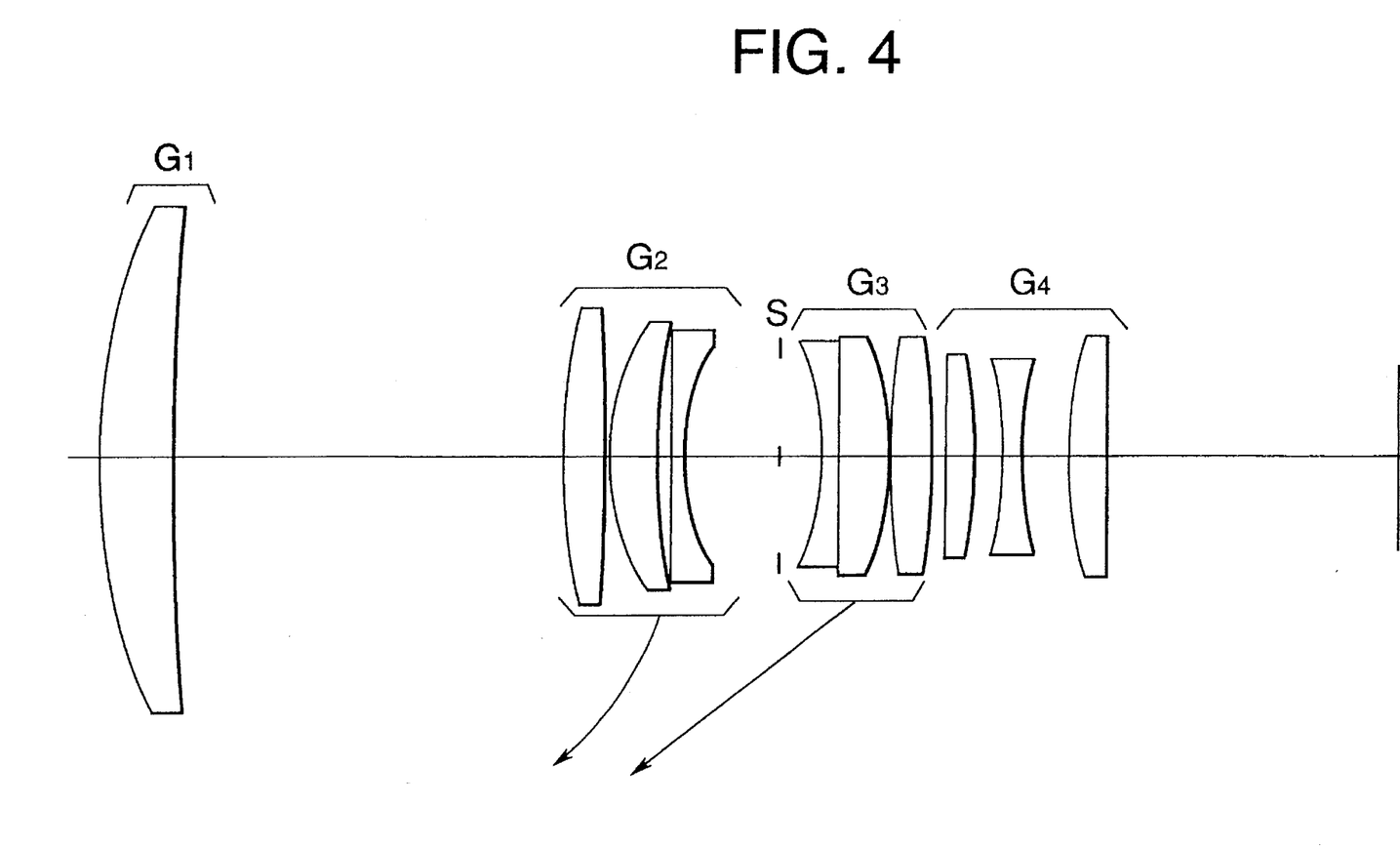
FIG. 4 is a diagram showing the structure of lenses of a second preferred embodiment according to the present invention.

In FIG. 4, the first lens group $G_1$ is constituted of a positive meniscus lens with a convex surface on the side of the subject which has slight positive refracting power underwater. The second lens group $G_2$ is constituted of a biconvex positive lens, a positive meniscus lens having a convex surface on the side of the subject and a negative meniscus lens having a convex surface on the side of the subject. The third lens group $G_3$ is constituted of a negative meniscus lens having a concave surface on the side of the subject, a positive lens cemented to the meniscus lens and a biconvex positive lens. Also, the fourth lens group $G_4$ is constituted of a biconvex positive lens, a biconcave negative lens and a positive meniscus lens having a convex surface on the side of the subject.

The following Table 2 shows values of various elements in the second embodiment. In the Table 2, f, β, F and 2ω respectively express the rear focal length of the whole system, the magnification, F-number and the field angle underwater in the infinity focus condition. Figures in the left end express the order from the side of the subject. Also, r, d, n and ν respectively express the radius of curvature of a lens surface, the distance between lens surfaces, the refractive index and the d-lines (λ=587.6 nm) of the Abbe's number.

TABLE 2

| | f = 105.0 mm | F = 2.83 | 2ω = 17.4° | |
|---|---|---|---|---|
| | r | d | ν | n |
| 1 | 81.654 | 10.00 | 64.1 | 1.51680 |
| 2 | 407.233 | (d2) | | |

TABLE 2-continued

| | f = 105.0 mm | F = 2.83 | 2ω = 17.4° | |
|---|---|---|---|---|
| | r | d | ν | n |
| 3 | 82.577 | 4.60 | 53.7 | 1.69350 |
| 4 | −1296.768 | 0.50 | | |
| 5 | 29.776 | 6.00 | 53.7 | 1.69350 |
| 6 | 63.967 | 1.60 | | |
| 7 | 151.679 | 1.80 | 30.0 | 1.69895 |
| 8 | 26.492 | (d8) | | |
| 9 | −30.457 | 1.80 | 38.0 | 1.60342 |
| 10 | −4000.000 | 6.50 | 45.4 | 1.79668 |
| 11 | −39.794 | 0.20 | | |
| 12 | 145.708 | 4.00 | 53.7 | 1.69350 |
| 13 | −144.295 | (d13) | | |
| 14 | 561.972 | 4.30 | 31.1 | 1.68893 |
| 15 | −53.260 | 4.20 | | |
| 16 | −44.324 | 2.00 | 39.6 | 1.80454 |
| 17 | 52.970 | 6.80 | | |
| 18 | 50.338 | 5.00 | 35.5 | 1.59507 |
| 19 | 406.753 | (Bf) | | |

| | f = 105.0000 | β = −0.5000 | β = −1.0000 |
|---|---|---|---|
| D0 | ∞ | 288.8088 | 183.1027 |
| d2 | 54.4956 | 29.3197 | 3.4337 |
| d8 | 20.3034 | 15.8606 | 14.6299 |
| d13 | 3.1635 | 32.7822 | 59.8990 |
| Bf | 40.0010 | 40.0010 | 40.0010 |

Condition corresponding values of this embodiment are shown below.
[Condition Corresponding Values]

(1) C'=−0.100 (β=−1.0)

(2) $C_S$=−0.325
$C_L$=−0.125
C=−0.150 (β=−0.5)

(3) $f_{23}/f$=0.739

(4) $(V_{41}-V_{42})/V_{43}$ =0.246

(5) $f/f_1$=0.105

Figure 5:
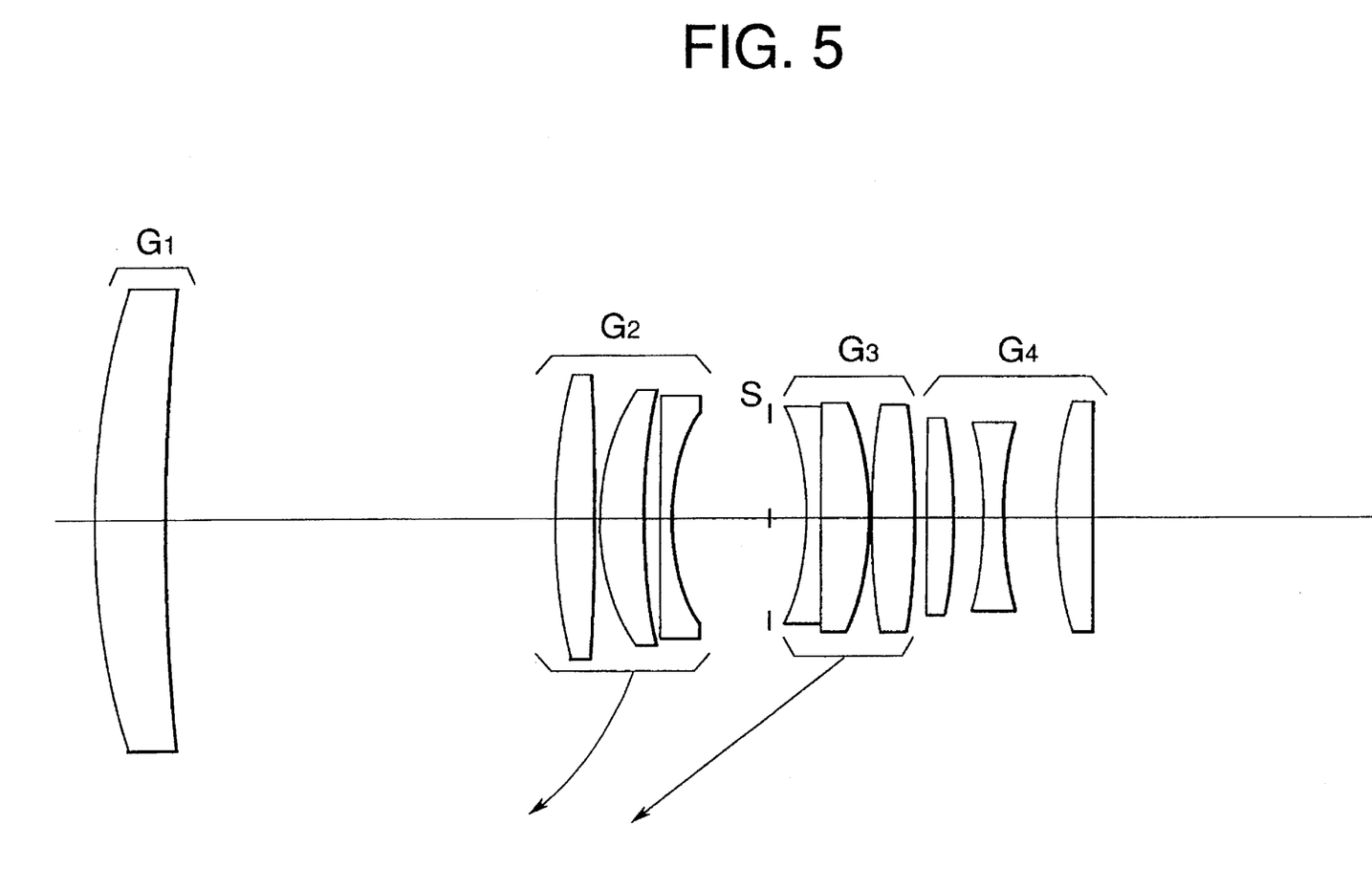
FIG. 5 is a diagram showing the structure of lenses of a third preferred embodiment according to the present invention.

Referring to FIG. 5, the lens groups of the third embodiment will be described.

In FIG. 5, the first lens group $G_1$ is constituted of a positive meniscus lens having a convex surface on the side of the subject which has a slight negative refracting power underwater. The second lens group $G_2$ is constituted of a biconvex positive lens, a positive meniscus lens having a convex surface on the side of the subject and a negative meniscus lens having a convex surface on the side of the subject. The third lens group $G_3$ is constituted of a negative meniscus lens having a concave surface on the side of the subject, a positive lens cemented to the meniscus lens and a biconvex positive lens. Further, the fourth lens group $G_4$ is constituted of a positive meniscus lens having a convex surface on the side of the image, a biconcave negative lens and a biconvex positive lens.

The following Table 3 shows values of various elements of the third embodiment. In the Table 3, f, β, F and 2ω respectively express the rear focal length of the whole system, the magnification, F-number and the field angle underwater in the infinity focus condition. Figures in the left end express the order from the side of the subject. Also, r, d, n and ν respectively express the radius of curvature of a lens surface, the distance between lens surfaces, the refractive index and the d-lines (λ=587.6 nm) of the Abbe's number.

TABLE 3

| | f = 105.0 mm | F = 2.84 | | 2ω = 17.4° |
|---|---|---|---|---|
| | r | d | ν | n |
| 1 | 119.500 | 10.00 | 64.1 | 1.51680 |
| 2 | 294.411 | (d2) | | |
| 3 | 79.858 | 5.00 | 53.7 | 1.69350 |
| 4 | −790.127 | 0.50 | | |
| 5 | 29.429 | 6.80 | 53.7 | 1.69350 |
| 6 | 68.894 | 1.20 | | |
| 7 | 107.100 | 1.80 | 31.1 | 1.68893 |
| 8 | 24.704 | (d8) | | |
| 9 | −30.552 | 1.80 | 37.0 | 1.61293 |
| 10 | −500.000 | 6.00 | 45.4 | 1.79668 |
| 11 | −38.343 | 0.20 | | |
| 12 | 107.587 | 3.80 | 53.7 | 1.69350 |
| 13 | −581.244 | (d13) | | |
| 14 | −386.693 | 3.80 | 29.5 | 1.71736 |
| 15 | −61.565 | 4.80 | | |
| 16 | −54.855 | 2.00 | 39.6 | 1.80454 |
| 17 | 45.249 | 8.00 | | |
| 18 | 53.560 | 6.00 | 38.0 | 1.60342 |
| 19 | −168.595 | (Bf) | | |

| | f = 105.0000 | β = −0.5000 | β = −1.0000 |
|---|---|---|---|
| D0 | ∞ | 293.2880 | 197.6724 |
| d2 | 56.8769 | 32.9487 | 4.3670 |
| d8 | 21.9182 | 15.9361 | 16.0838 |
| d13 | 3.0968 | 33.0071 | 61.4411 |
| Bf | 41.9081 | 41.9081 | 41.9081 |

Next, condition corresponding values are shown below.
[Condition Corresponding Values]

(1) C'=−0.100 (β=−1.0)

(2) $C_S$ =−0.325
$C_L$=−0.125
C=−0.200 (β=−0.5)

(3) $f_{23}/f$=0.736

(4) $(V_{41}-V_{42})/V_{43}$=0.331

(5) $f/f_1$=−0.021

Next, referring to FIG. 6, the lens groups of the fourth embodiment will be described.

Figure 6:
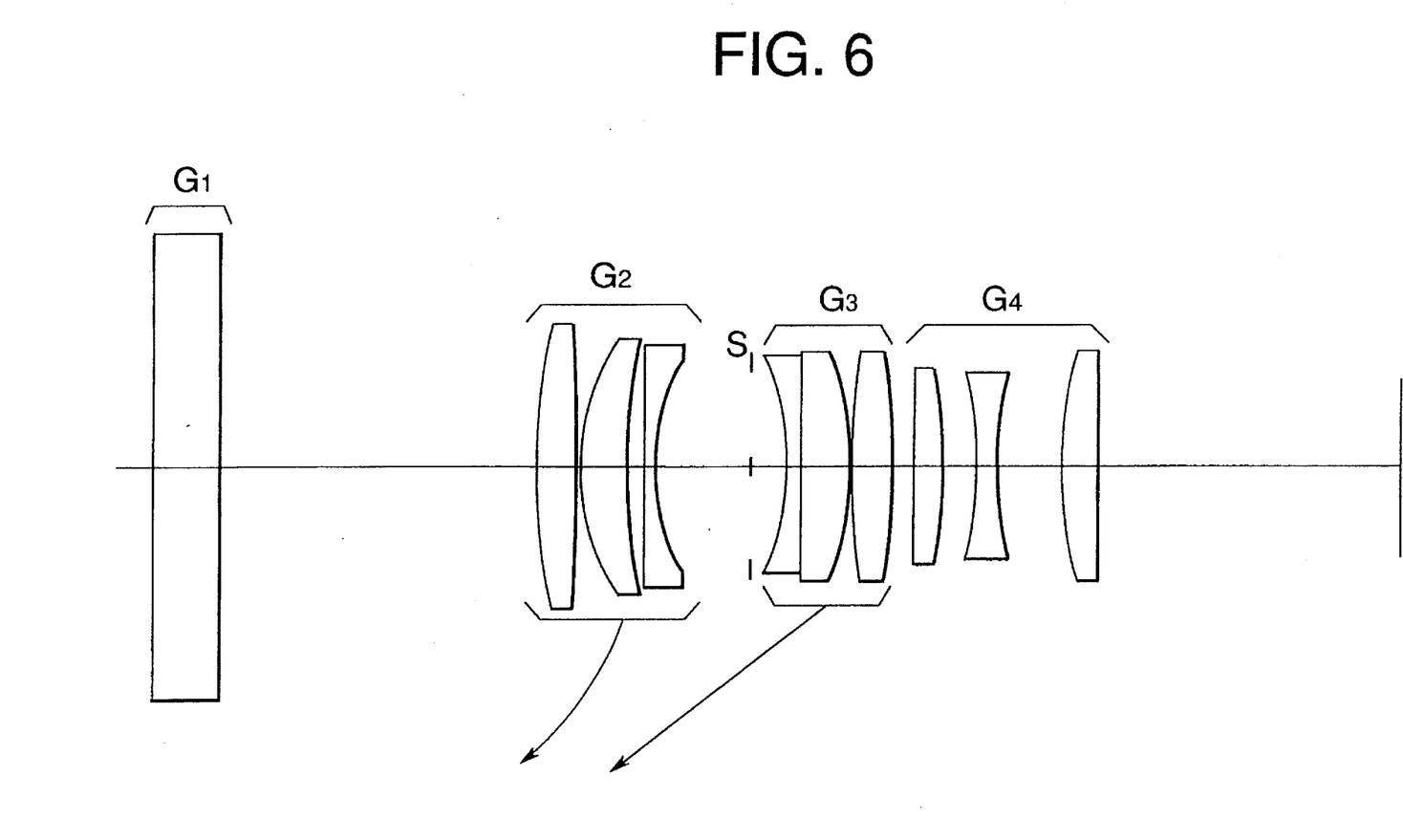
FIG. 6 is a diagram showing the structure of lenses of a fourth preferred embodiment according to the present invention.

In FIG. 6, the first lens group $G_1$ is constituted of a parallel-plane-plate having no refracting power. The second lens group $G_2$ is constituted of a biconvex positive lens, a positive meniscus lens having a convex surface on the side of the object and a negative meniscus lens having a convex surface on the side of the subject. The third lens group $G_3$ is constituted of a negative meniscus lens having a concave surface on the side of the subject, a positive lens cemented to the meniscus lens and a biconvex positive lens. Further, the fourth lens group $G_4$ is constituted of a positive meniscus lens having a convex surface on the side of the image, the biconcave negative lens and a biconvex positive lens.

The following Table 4 shows values of various elements of the fourth embodiment. In the Table 4, f, β, F and 2ω respectively express the rear focal length of the whole system, the magnification, F-number and the field angle underwater in the infinity focus condition. Figures in the left end express the order from the side of the subject. Also, r, d, n and ν respectively express the radius of curvature of a lens surface, the distance between lens surfaces, the refractive index and the d-lines (λ=587.6 nm) of the Abbe's number.

TABLE 4

| | f = 105.0 mm | F = 2.84 | | 2ω = 17.4° |
|---|---|---|---|---|
| | r | d | ν | n |
| 1 | 0.000 | 10.00 | 64.1 | 1.51680 |
| 2 | 0.000 | (d2) | | |
| 3 | 79.083 | 5.20 | 53.7 | 1.69350 |
| 4 | −469.898 | 0.50 | | |
| 5 | 34.439 | 5.80 | 48.1 | 1.71700 |
| 6 | 89.160 | 1.50 | | |
| 7 | 238.015 | 1.80 | 30.0 | 1.69895 |
| 8 | 28.653 | (d8) | | |
| 9 | −28.174 | 1.80 | 35.7 | 1.62588 |
| 10 | −5000.000 | 7.00 | 47.5 | 1.78797 |
| 11 | −37.123 | 0.50 | | |
| 12 | 144.075 | 4.50 | 53.7 | 1.69350 |
| 13 | −111.214 | (d13) | | |
| 14 | −539.646 | 3.50 | 27.6 | 1.74077 |
| 15 | −64.266 | 5.80 | | |
| 16 | −51.846 | 2.00 | 45.4 | 1.79668 |
| 17 | 43.104 | 9.80 | | |
| 18 | 49.665 | 6.00 | 49.0 | 1.53172 |
| 19 | −247.379 | (Bf) | | |

| | f = 105.0000 | β = −0.5000 | β = −1.0000 |
|---|---|---|---|
| D0 | ∞ | 279.2926 | 175.9999 |
| d2 | 45.3697 | 27.3999 | 3.1559 |
| d8 | 21.0513 | 15.0614 | 16.3609 |
| d13 | 3.3988 | 27.3586 | 50.3031 |
| Bf | 42.5830 | 42.5830 | 42.5830 |

Condition corresponding values are shown below.
[Condition Corresponding Values]

(1) C'=−0.100 (β=−1.0)

(2) $C_S$=−0.325
$C_L$=−0.125
C=−0.250 (β=−0.5)

(3) $f_{23}/f$=0.671

(4) $(V_{41}-V_{42})/V_{43}$ =0.693

(5) $f/f_1$=0

Next, referring to FIG. 7, the lens groups of the fifth embodiment will be described.

Figure 7:
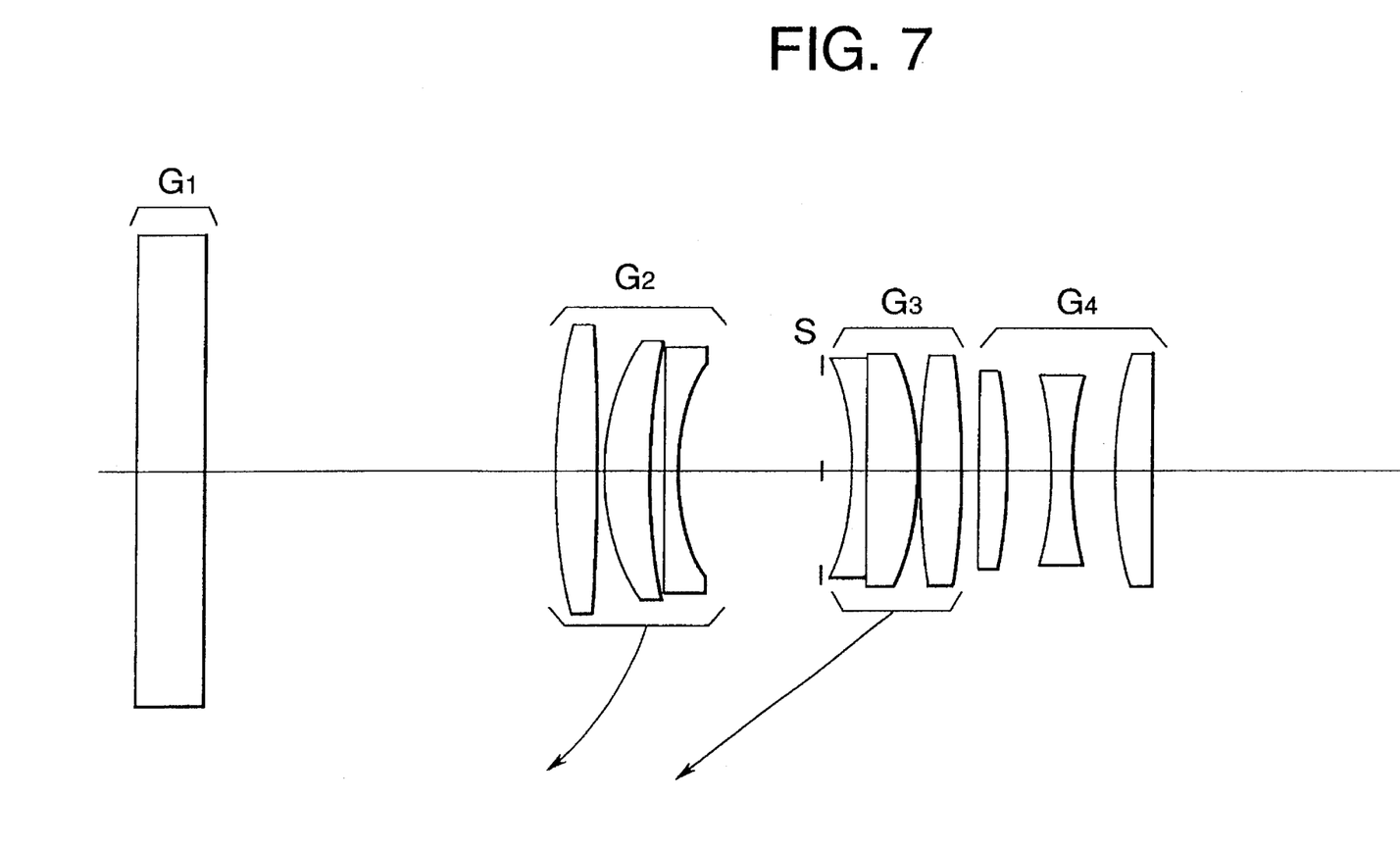
FIG. 7 is a diagram showing the structure of lenses of a fifth preferred embodiment according to the present invention.

In FIG. 7, the first lens group $G_1$ is constituted of a parallel-plane-plate having no refracting power. The second lens group $G_2$ is constituted of a biconvex positive lens, a positive meniscus lens having a convex surface on the side of the subject and a negative meniscus lens having a convex surface on the side of the subject. The third lens group $G_3$ is constituted of a negative meniscus lens having a concave surface on the side of the subject, a positive lens cemented to the meniscus lens and a biconvex positive lens. Further, the fourth lens group $G_4$ is constituted of a biconvex positive lens, a biconcave negative lens and a positive meniscus lens having a convex surface on the side of the subject.

The following Table 5 shows values of various elements of the fifth embodiments. In the Table 5, f, β, F and 2ω respectively express the rear focal length of the whole system, the magnification, F-number and the field angle underwater in the infinity focus condition. Figures in the left end express the order from the side of the subject. Also, r, d, n and ν respectively express the radius of curvature of a lens surface, the distance between lens surfaces, the refractive index and the d-lines (λ=587.6 nm) of the Abbe's number.

TABLE 5

| | f = 105.0 mm | F = 2.84 | 2ω = 17.4° | |
|---|---|---|---|---|
| | r | d | ν | n |
| 1 | 0.000 | 10.00 | 64.1 | 1.51680 |
| 2 | 0.000 | (d2) | | |
| 3 | 89.823 | 5.00 | 53.7 | 1.69350 |
| 4 | −707.620 | 0.70 | | |
| 5 | 34.111 | 6.00 | 53.7 | 1.69350 |
| 6 | 88.402 | 1.90 | | |
| 7 | 213.408 | 1.80 | 30.0 | 1.69895 |
| 8 | 29.951 | (d8) | | |
| 9 | −31.034 | 1.80 | 37.0 | 1.61293 |
| 10 | −1000.000 | 7.00 | 45.4 | 1.79668 |
| 11 | −40.625 | 0.50 | | |
| 12 | 146.003 | 4.50 | 53.7 | 1.69350 |
| 13 | −148.202 | (d13) | | |
| 14 | 240.705 | 4.00 | 30.0 | 1.69895 |
| 15 | −71.725 | 6.30 | | |
| 16 | −52.830 | 2.00 | 39.6 | 1.80454 |
| 17 | 44.789 | 6.80 | | |
| 18 | 46.213 | 5.00 | 41.4 | 1.57501 |
| 19 | 395.564 | (Bf) | | |

| | f = 105.0000 | β = −0.5000 | β = −1.0000 |
|---|---|---|---|
| D0 | ∞ | 285.9806 | 186.0397 |
| d2 | 50.8070 | 27.7489 | 3.1652 |
| d8 | 26.1738 | 18.4878 | 14.2634 |
| d13 | 3.2798 | 34.0240 | 62.8320 |
| Bf | 40.6530 | 40.6530 | 40.6530 |

Condition corresponding values are shown below.
[Condition Corresponding Values]

(1) $C'=-0.200$ ($\beta=-1.0$)

(2) $C_S=-0.375$
   $C_L=-0.225$
   $C=-0.250$ ($\beta=-0.5$)

(3) $f_{23}/f=0.762$ (4) $(V_{41}-V_{42})/V_{43}=0.333$ (5) $f/f_1=0$

In the present invention, if the second and third lens groups $G_2$ and $G_3$ are structured so as to be shiftable traversely with respect to the optical axis, it is possible to correct the blurred image. Also, if the fourth lens group $G_4$ is structured so as to be shiftable traversely with respect to the optical axis, it is possible to correct the blurred image.

What is claimed is:

1. A taking lens for an underwater camera, comprising:
  a first lens group having slight refracting power at most, underwater;
  a second lens group having positive refracting power;
  a third lens group having positive refracting power;
  a fourth lens group having negative refracting power, said first to fourth lens groups being arranged in the order from said first to fourth lens groups from the side of a subject; and
  when focusing from infinity to a closer distance, said first lens group being fixed to an image surface and said second and third lens groups being moved along an optical axis away from said image surface toward said subject such that the distance between said second and third lens groups is changed.

2. A taking lens for an underwater camera, according to claim 1, wherein the distance between said second and third lens groups at a certain magnification is smaller than the distance between said second and third lens groups in an infinity focus condition.

3. A taking lens for an underwater camera, according to claim 1, wherein when focusing from the infinity to a closer distance, said second lens group is shifted in the optical axis direction along a locus which draws a curve projecting toward said image surface and said third lens group is shifted in the optical axis direction linearly.

4. A taking lens for an underwater camera according to claim 1, further comprising a structure which satisfying the following conditions:

$$-0.30 < C' < 0$$
$$C_S < C < C_L$$
$$C_S = -(C' + 0.45)\beta - 0.5$$
$$C_L = -0.05\beta + (C' - 0.05),$$

wherein

β: a certain magnification

C': a focusing coefficient in a closest distance focus condition ($C'=\Delta_2'/\Delta_3'$)

C: a focusing coefficient at the magnification Δ ($C=\Delta_2/\Delta_3$)

$\Delta_2'$: the change amount of the distance between said second and third lens groups in the closest distance focus condition from an infinity focus condition $\Delta_3'$: the change amount of the distance between said third and fourth lens groups in the closest distance focus condition from the infinity focus condition $\Delta_2$: the change amount of the distance between said second and third lens groups at the magnification β from the infinity focus condition $\Delta_3$: the change amount of the distance between said third and fourth lens groups at the magnification β from the infinity focus condition.

5. A taking lens for an underwater camera according to claim 1, further comprising a structure which satisfies the following condition:

$$0.65 < f_{23}/f < 0.85,$$

wherein f is a rear focal length of the entire optical system in an infinity focus condition when subject field medium is water and $f_{23}$ is a composite focal length of said second and third lens groups in the infinity focus condition.

6. A taking lens for an underwater camera according to claim 1, wherein said fourth lens group comprises in the order from the side of said subject a first lens element with positive refracting power, a second lens element with negative refracting power and a third lens element with positive refracting power and when the inverse number of the Abbe's number of said first lens element, the inverse number of the Abbe's number of said second lens element and the inverse number of the Abbe's number of said third lens element are respectively assumed to be $V_{41}$, $V_{42}$ and $V_{43}$, the following condition is satisfied:

$$0.20 < (V_{41} - V_{42})/V_{43} < 0.75.$$

7. A taking lens for an underwater camera according to claim 1, further comprising a structure which satisfies the following condition:

$$-0.25 < f/f_1 < 0.25,$$

wherein f is a rear focal length of the entire optical system and $f_1$ is a focal length of said first lens group when subject field medium is water.

8. A taking lens for an underwater camera according to claim 1, wherein said first lens group has a parallel-plane-plate.

9. A taking lens for an underwater camera according to claim 1, wherein said first lens group has a meniscus-shaped positive lens element with a convex surface on the side of said object.

10. A taking lens for an underwater camera according to claim 1, wherein said second lens group has in the order from the side of said object a positive lens element having an intense convex surface on the side of said subject, a meniscus-shaped positive lens element having a convex surface on the side of said subject and a meniscus-shaped negative lens element having a convex surface on the side of said subject.

11. A taking lens for an underwater camera according to claim 1, wherein said third lens group has in the order from said subject a joined lens element which is formed by joining a negative lens element and a positive lens element and has as a whole a convex surface on the side of said subject and a biconvex positive lens element.

12. A taking lens for an underwater camera according to claim 1, wherein said fourth lens group has in the order from said subject a positive lens element having an intense convex surface on the side of an image, a biconcave negative lens element and a positive lens element having an intense convex surface on the side of said subject.

13. A taking lens for an underwater camera according to claim 1, further comprising a diaphragm disposed adjacently to said third lens group on the side of said subject.

14. A taking lens for an underwater camera comprising:

a first lens group having no or slight refracting power;

a second lens group having positive refracting power;

a third lens group having positive refracting power;

a fourth lens group having negative refracting power, said first to fourth lens groups being arranged in the order from said first to fourth lens groups from the side of a subject; and when focusing from infinity to a closer distance, said first lens group being fixed to an image surface while said second and said third lens groups are moved along an optical axis away from said image surface toward said subject so as to change the distance between said second and third lens groups, said second and said third lens group being structured to satisfy the following conditions:

$$-0.30 < C < 0$$
$$C_S < C < C_L$$
$$C_S = -(C' + 0.45)\beta - 0.5$$
$$C_L = -0.05\beta + (C' - 0.05),$$

wherein $\beta$: a certain magnification $C'$: a focusing coefficient in a closest distance focus condition ($C' = \Delta_2'/\Delta_3'$)

$C$: a focusing coefficient at the magnification $\beta$ ($C = \Delta_2/\Delta_3$)

$\Delta_2'$: the change amount of the distance between said second and third lens groups in the closest distance focus condition from an infinity focus condition $\Delta_3'$: the change amount of the distance between said third and fourth lens groups in the closest distance focus condition from the infinity focus condition $\Delta_2$: the change amount of the distance between said second and third lens groups at the magnification $\beta$ from the infinity focus condition $\Delta_3$: the change amount of the distance between said third and fourth lens groups at the magnification $\beta$ from the infinity focus condition.

15. A taking lens for an underwater camera according to claim 14, further comprising a structure which satisfies the following condition:

$$0.65 < f_{23}/f < 0.85$$

wherein f is a rear focal length of the entire optical system in the infinity focus condition when subject field medium is water and $f_{23}$ is a composite focal length of said second and third lens groups in the infinity focus condition.

16. A taking lens for an underwater camera according to claim 14, wherein said fourth lens group comprises in the order from the side of said subject a first lens element with positive refracting power, a second lens element with negative refracting power and a third lens element with positive refracting power and when the inverse number of the Abbe's number of said first element, the inverse number of the Abbe's number of said second lens element and the inverse number of the Abbe's number of said third lens element are respectively assumed to be $V_{41}$, $V_{42}$ and $V_{43}$, the following condition is satisfied:

$$0.20 < (V_{41} - V_{42})/V_{43} < 0.75.$$

17. A taking lens for an underwater camera according to claim 14, further comprising a structure which satisfies the following condition:

$$-0.25 < f/f_1 < 0.25,$$

wherein f is a rear focal length of the entire optical system and $f_1$ is a focal length of said first lens group when subject field medium is water.

18. A taking lens for an underwater camera, comprising:

a first lens group having slight refracting power;

a second lens group having positive refracting power;

a third lens group having positive refracting power;

a fourth lens group having negative refracting power, said first to fourth lens groups being arranged in the order from said first to fourth lens groups from the side of a subject;

when focusing from infinity to a closer distance, said first lens group being fixed to an image surface and said second and third lens groups being moved along an optical axis away from said image surface toward said subject such that the distance between said second and third lens groups is changed; and when focusing from the infinity to a closer distance, said second lens group being shifted in the optical axis direction along a locus which draws a curve projecting toward said image surface and said third lens group being shifted in the optical axis direction linearly.

19. A taking lens for an underwater camera, comprising:

a first lens group having slight refracting power;

a second lens group having positive refracting power;

a third lens group having positive refracting power;

a fourth lens group having negative refracting power, said first to fourth lens groups being arranged in the order from said first to fourth lens groups from the side of a subject;

when focusing from infinity to a closer distance, said first lens group being fixed to an image surface and said second and third lens groups being moved along an optical axis away from said image surface toward said subject such that the distance between said second and third lens groups is changed; and a structure which satisfies the following conditions:

$$-0.30 < C < 0$$

-continued $C_S < C < C_L$
$C_S = -(C + 0.45)\beta - 0.5$
$C_L = -0.05\beta + (C - 0.05)$, wherein β: a certain magnification C': a focusing coefficient in a closest distance focus condition ($C'=\Delta_2/\Delta_3$)

C: a focusing coefficient at the magnification $\beta(C=\Delta_2'/\Delta_3')$ $\Delta_2'$: the change amount of the distance between said second and third lens groups in the closest distance focus condition from an infinity focus condition $\Delta_3'$: the change amount of the distance between said third and fourth lens groups in the closest distance focus condition from the infinity focus condition $\Delta_2$: the change amount of the distance between said second and third lens groups at the magnification β from the infinity focus condition $\Delta_3$: the change amount of the distance between said third and fourth lens groups at the magnification β from the infinity focus condition.

20. A taking lens for an underwater camera, comprising:

a first lens group having slight refracting power;

a second lens group having positive refracting power;

a third lens group having positive refracting power;

a fourth lens group having negative refracting power, said first to fourth lens groups being arranged in the order from said first to fourth lens groups from the side of a subject;

when focusing from infinity to a closer distance, said first lens group being fixed to an image surface and said second and third lens groups being moved along an optical axis away from said image surface toward said subject such that the distance between said second and third lens groups is changed; and a structure which satisfies the following condition:

$0.65<f_{23}/f<0.85$, wherein f is a rear focal length of the entire optical system in an infinity focus condition when subject field medium is water and $f_{23}$ is a composite focal length of said second and third lens groups in the infinity condition.

21. A taking lens for an underwater camera, comprising:

a first lens group having slight refracting power;

a second lens group having positive refracting power;

a third lens group having positive refracting power;

a fourth lens group having negative refracting power, said first to fourth lens groups being arranged in the order from said first to fourth lens groups from the side of a subject; and when focusing from infinity to a closer distance, said first lens group being fixed to an image surface and said second and third lens groups being moved along an optical axis away from said image surface toward said subject such that the distance between said second and third lens groups is changed; and wherein said fourth lens group comprises, in the order from the side of said subject, a first lens element with positive refracting power, a second lens element with negative refracting power and a third lens element with positive refracting power and when the inverse number of the Abbe's number of said first lens element, the inverse number of the Abbe's number of said second lens element and the inverse number of the Abbe's number of said third lens element are respectively assumed to be $V_{41}$, $V_{42}$, and $V_{43}$, the following condition is satisfied:

$0.20<(V_{41}-V_{42})/V_{43}<0.75$.

22. A taking lens for an underwater camera, comprising:

a first lens group having slight refracting power;

a second lens group having positive refracting power;

a third lens group having positive refracting power;

a fourth lens group having negative refracting power, said first to fourth lens groups being arranged in the order from said first to fourth lens groups from the side of a subject;

when focusing from infinity to a closer distance, said first lens group being fixed to an image surface and said second and third lens groups being moved along an optical axis away from said image surface toward said subject such that the distance between said second and third lens groups is changed; and a structure which satisfies the following condition:

$-0.25<f/f_1<0.25$, wherein f is a rear focal length of the entire optical system and $f_1$ is a focal length of said first lens group when subject field medium is water.

23. A taking lens for an underwater camera, comprising:

a first lens group having slight refracting power;

a second lens group having positive refracting power;

a third lens group having positive refracting power;

a fourth lens group having negative refracting power, said first to fourth lens groups being arranged in the order from said first to fourth lens groups from the side of a subject; and when focusing from infinity to a closer distance, said first lens group being fixed to an image surface and said second and third lens groups being moved along an optical axis away from said image surface toward said subject such that the distance between said second and third lens groups is changed; and wherein said first lens group has a parallel-plane-plate.

24. A taking lens for an underwater camera, according to claim 1, wherein said refracting power of said first lens group is substantially smaller than the refracting power of the second, third, and fourth lens groups.

* * * * *